(12) United States Patent
Morlan et al.

(10) Patent No.: US 6,240,789 B1
(45) Date of Patent: Jun. 5, 2001

(54) PERMANENTLY INSTRUMENTED ACTUATED VALVE ASSEMBLY, WITH INTERNALLY-GAUGED, PERMANENTLY INSTRUMENTED SHAFT

(75) Inventors: David E. Morlan, Marietta; Christopher P. Smith, Woodstock, both of GA (US)

(73) Assignee: Crane Nuclear, Inc., Kennesaw, GA (US)

(*) Notice: Subject to any disclaimer, the term of this patent is extended or adjusted under 35 U.S.C. 154(b) by 0 days.

(21) Appl. No.: 09/309,636

(22) Filed: May 11, 1999

Related U.S. Application Data

(60) Provisional application No. 60/085,544, filed on May 15, 1998, and provisional application No. 60/114,353, filed on Dec. 29, 1998.

(51) Int. Cl.[7] .................................................. G01L 1/02
(52) U.S. Cl. ........................................ 73/862.582; 73/168
(58) Field of Search ............................... 73/168, 862.08, 73/862.323, 862.381, 862.49, 862.582, 862.583

(56) References Cited

U.S. PATENT DOCUMENTS

| | | | |
|---|---|---|---|
| 3,583,231 | * 6/1971 | Felton | 73/863.83 |
| 4,148,219 | * 4/1979 | Golding et al. | 73/862.631 |
| 4,429,579 | * 2/1984 | Wilhelm | 73/768 |
| 4,453,422 | 6/1984 | Yorgiadis | 73/862.66 |
| 4,458,543 | * 7/1984 | Mieth | 73/863.86 |
| 4,754,648 | * 7/1988 | Byrd et al. | 73/744 |
| 4,759,224 | 7/1988 | Charbonneau et al. | 73/862.31 |
| 4,762,003 | * 8/1988 | Cioletti | 73/825 |
| 4,787,245 | 11/1988 | Anderson et al. | 73/168 |
| 5,090,239 | 2/1992 | Balaschak et al. | 73/168 |
| 5,469,737 | 11/1995 | Smith et al. | 73/168 |
| 5,747,697 | 5/1998 | Johnson et al. | 73/760 |
| 5,754,101 | * 5/1998 | Tsunetomi et al. | 340/442 |

* cited by examiner

Primary Examiner—Max Noori
(74) Attorney, Agent, or Firm—Womble Carlyle Sandbridge & Rice

(57) ABSTRACT

A permanently instrumented actuated valve assembly includes at least one internally-gauged, permanently instrumented shaft functioning as a load bearing component through which an actuator drives a valve element. The shaft has a longitudinal (preferably axial), internal bore generally extending from the one end of the shaft to a point therewithin. A thrust monitoring instrument is mounted within the axial bore and monitors axial forces acting on the shaft to provide an indication of the performance of the valve assembly. Alternatively, one or more transverse bores extending from the internal bore to the external surface of the valve stem are provided with torsional force monitoring instruments being received within such transverse bore(s).

8 Claims, 6 Drawing Sheets

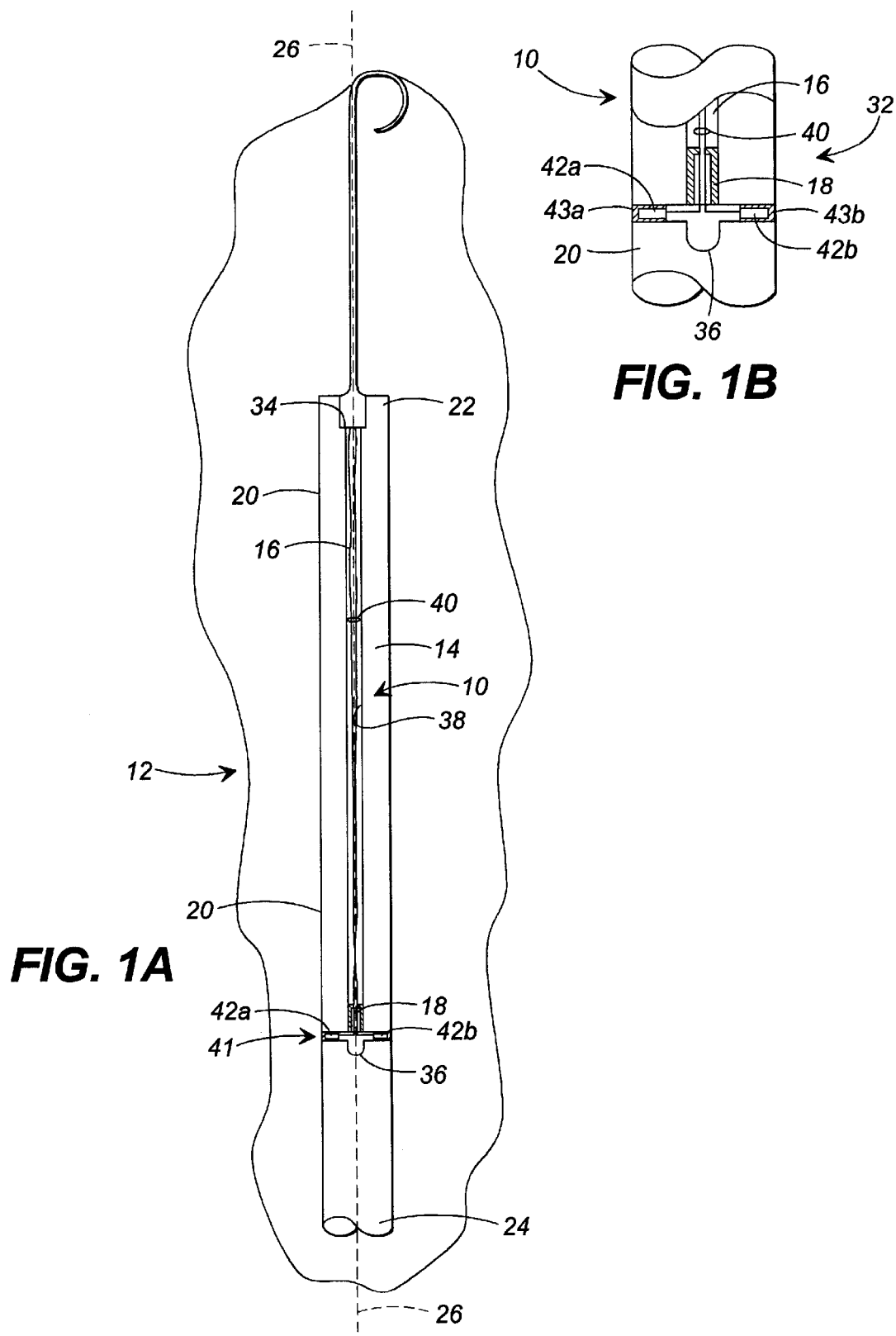

PERMANENTLY INSTRUMENTED ACTUATED VALVE ASSEMBLY, WITH INTERNALLY-GAUGED, PERMANENTLY INSTRUMENTED SHAFT

CROSS-REFERENCE TO RELATED APPLICATIONS

This application claims the benefit of U.S. Provisional Patent Application No. 60/085,544, filed May 15, 1998, and U.S. Provisional Patent Application No. 60/114,353, filed Dec. 29, 1998.

TECHNICAL FIELD

The present invention generally relates to systems for monitoring and evaluating the forces on a stem or shaft. In particular, the present invention relates to systems for monitoring and evaluating the performance of actuated valve assemblies utilizing sensors mounted to the stems or shafts of the actuated valve assemblies.

BACKGROUND OF THE INVENTION

Actuated valve assemblies are in common use in a variety of industrial applications for the control of the rate of flow of fluid mediums such as steam, water, or other fluids. For purposes of this disclosure, an actuated valve assembly generally will consist of an actuator operatively connected to a valve stem for driving the valve stem, to move a valve element (for example, a gate or plug) within a valve chamber to open and close a valve port. In general, actuated valve assemblies fall within two basic categories which include rising stem valves where the valve stem is axially drawn into and out of the valve body through a gland seal, and rotary or quarter-turn valves where the valve stem is rotated approximately 90° to open or close the value by positioning a rotatable disk or ball having a flow opening formed therein. Rising stem valves further include "rising, non-rotating-stem valves" where the stem is moved axially without rotation, and "rising, rotating-stem valves" where the valve stem is raised and lowered through a rotary or screw type motion.

With respect to the actuation of such actuated valve assemblies, there are two general types of actuated valve assemblies, including: (i) motor-operated valves ("MOV's") which utilize the electric or hydraulic torque motor to turn a worm on a worm gear, turning a rotating drive sleeve that drives either a power screw or a gearbox input shaft, for driving or powering a valve stem and connected valve element; and (ii) pressure-operated pneumatic or hydraulic actuators (mostly air operated valves or "AOV's") in which a fluid pressure acting on a diaphragm or piston, and often opposed by a spring, provides a linear force for moving a rising stem valve or operating a drive which moves a rotary or quarter-turn valve.

Examples of MOV's include rising, non-rotating-stem valve assemblies and rising, rotating-stem valve assemblies and rotary or quarter-turn valve assemblies.

Examples of AOV's include rising, non-rotating-stem valve assemblies, and rotary or quarter-turn valve assemblies.

Currently, it is known to include monitoring systems or devices within the valve bodies or housings of conventional actuated valve assemblies for monitoring and evaluating axial and torsional forces being exerted upon the valve during the operation of the valve to provide an indication of the performance of the valve assembly.

There are monitoring instruments, both temporarily and permanently installable, primarily available for motor-operated valves such as Limitorque-driven units such as are found in nuclear power plants. Such devices are shown in patents typically classified in U.S. patent class 73, subclass 168, and an example of which are shown in U.S. Pat. Nos. 4,787,245 and 5,469,737. Additionally, U.S. Pat. No. 5,090,239 teaches a valve sensing instrument mounted within grooves or cutouts formed along the exterior sidewall of the valve stem, typically just above the packing of the valve assembly.

One problem that appears to still exist with known measured valve assemblies is, however, the exposure of the valve sensors or monitoring instruments to the environment of the valve where such sensors are subject to damage and environmental influence.

Accordingly, a need exists for an actuated valve assembly having a system for monitoring and evaluating the forces acting on the valve stem or shaft that can operate efficiently despite the environmental conditions within the valve assembly and which is easy and economical to manufacture and can easily be installed as a replacement for existing load.

SUMMARY OF THE INVENTION

Briefly described, the present invention is directed to a permanently instrumented, actuated valve assembly having a precisely calibrated gauge or monitoring instrument for the measurement of axial force and/or torque exerted on a shaft or stem of the actuated valve assembly, which monitoring instrument is internally received within the stem or shaft. Such monitoring instrument includes strain gauges or similar sensors as are known in the art for measuring various parameters including axial and torsional forces exerted upon a shaft/stem. The monitoring instrument or sensor further is calibrated for the measurement of one or both of the axial force or torsional forces exerted upon a load path component in an actuated valve assembly for the purpose of diagnostics or performance monitoring of the operation of the valve assembly.

The output signals generated by the monitoring instrument provide a feedback or control signal for a valve control system for controlling the operation of the valve assembly or to provide switching, shutoff or alarm functions.

It will be understood that the teachings of this invention are directed to shafts or stems for various types of actuated assemblies, but for purposes of illustration of preferred embodiments, the invention will be disclosed in relation to actuated valve assemblies. Since the terms "stem" and "shaft" may be considered to have specific meaning within the industry, the term "shaft" shall be used herein to refer to any load path component which is capable of being drilled and instrumented in the manner expressed in accordance with the present invention, unless that stem is preceded by modifying terms (for example, "actuator output shaft" or "valve input shaft"), in which case the "shaft" shall mean the specific species of shaft as so defined. It is fundamental to the present invention that the "shaft" which is instrumented in accordance with this invention is a normal load path component (or a replacement for a normal load path component) whose primary function is as an operative component of the actuated valve assembly, and its load sensing function is adjunct or secondary. That is, if no torque or thrust measurements were to be performed, the "shaft" would still be required for normal, proper operation of the valve element moving function of the valve element moving function of the actuated valve assembly.

Accordingly, in preferred embodiments of the present invention, an actuated valve assembly is provided with an internally mounted monitoring system. In accordance with the present invention, an internal bore is formed in a shaft of the actuated valve assembly. The internal bore generally is a longitudinally, preferably axially, drilled bore, and, in alternate embodiments, a transversely extending bore is formed in the shaft in conjunction with the axial bore. In preferred embodiments, the axially drilled bore is a blind center gun drilled axial bore. The axially extending bore preferably extends from a first or upper end of the shaft to an intermediate point along the length of the shaft. In embodiments of the invention including a transversely extending bore, the transverse bore, preferably, extends radially from the shaft periphery into the center of the shaft, and, most preferably, diametrically through the shaft. The transversely extending bore and the longitudinally drilled bore, preferably, intersect. A gauging or monitoring instrument such as a strain gauge or other, similar force sensor is received within one or both of the axial and transverse bores of the shaft and functions to monitor various operational parameters at the shaft including the amount of force or strain (resulting in either thrust or torque) being applied to the shaft. The instrumentation of the present invention preferably measures force exerted parallel to the centerline of the respective bore.

Prior to the insertion of the monitoring instrument(s) into the respective bore, the monitoring instrument(s) generally will have been calibrated, such as in a precision loading frame, for measurement of the desired parameters including measurement of axial force, torque or other parameters of the shaft. The ends of the transverse bore, preferably, are sealed with metal plugs or a filler to seal the sensor within the transverse bore of the shaft. The instrument wiring preferably exits the shaft through the axial bore opening at the first or upper end of the shaft. Preferably, though not necessarily, the opening through which the wires exit is sealed around the wiring. The preferred result is an internally gauged, permanently instrumented shaft.

As a result of the internal mounting of the monitoring instrument(s) within the bore(s) of the shaft, the monitoring instrument is effectively sealed and insulated from exposure to environmental extremes or mechanical damage occasioned by the operation of the shaft for opening and closing the valve. The resulting assembly further is temperature-compensated, crosstalk-compensated, and modulus-compensated. Such an instrumented shaft thus greatly enhances safety and allows precision long term monitoring of the condition of a valve such as, for example, in a nuclear power plant system, without significant damage or degradation of the sensor assembly or host shaft.

In accordance with the various, alternate, preferred embodiments of the system (apparatus and methods) of the present invention, the internally gauged, permanently instrumented shaft of the present invention alternatively functions as the actuator stem, valve stem, bell crank/torque arm, actuator output shaft, or gearbox input shaft or other load path component of various linear actuators and valve assemblies and various quarter-turn actuators and valve assemblies. The resultant, alternate actuated valve assemblies constitute inventive combinations embodied as alternate embodiments of the permanently instrumented actuated valve assembly of the present invention. When selecting, in accordance with the present invention, which shaft, stem or other load path component of an actuated valve assembly will comprise the internally gauged permanently instrumented shaft of the present invention, and which embodiment of such instrumented shaft is preferred for a particular application, attention is directed to the values (of forces and torque) of interest in the particular application. Without limiting the actuated valve assembly embodiments of the present invention, the following are the most preferred representative embodiments:

a. A Motor-Operated Valve (MOV) assembly embodiment with a rising, non-rotating valve stem. Values of interest, in accordance with the present invention, are actuator output torque and axial stem force. Both are preferably measured in the stem above the packing gland, but care must be taken when an anti-rotation device is present outside of the valve body. Since all motor actuators produce a torque on the stem, all rising, non-rotating-stem MOV's have some type of anti-rotation device to prevent the stem from turning. The anti-rotation device can be, for example, a linear guide or rail on the disk itself, a lever arm fixed to the stem that rides a slot in the yoke, or a key fixed in the upper yoke flange or yoke arm that rides a slot in the stem.

b. A MOV assembly embodiment with rising, rotating valve stem. The actuator turns a splined drive nut which is fixed to the end of the valve stem but can slide axially inside the splined drive sleeve. The stem is screwed through the fixed yoke nut, moving the plug axially. Values of interest are actuator output torque and axial stem force. Torque is preferably measured in the stem below the splined drive nut and above the fixed yoke nut. Force is preferably measured in the stem between the yoke nut and the packing gland.

c. An MOV assembly embodiment with a quarter-turn gearbox on a rotary valve. Values of interest are actuator output torque and gearbox output torque (valve stem torque). Actuator output torque is preferably measured in the gearbox input shaft. Valve stem torque is preferably measured in the valve stem between the gearbox drive-sleeve and the packing gland.

d. A pressure-actuated valve assembly embodiment, including an Air-Operated Valve (AOV), with a rising stem. There is no rotation issue and no torque, since these actuators produce a linear force directly. The value of interest is the axial stem force. The axial force is preferably measured in the actuator stem, preferably at the end nearest the valve, or in the valve stem.

e. An AOV assembly embodiment, having a quarter-turn rotary valve with a simple torque arm that converts the actuator's linear force to a torque on the valve stem and including a spring-and-diaphragm actuator, or, alternately, a piston actuator. Values of interest are actuator force and valve stem torque. Force is preferably measured in the actuator stem or one of the connector pieces. Torque is preferably measured in the torque arm or the valve stem. A rig, with the actuator stem coupled directly to the end of the torque arm, is mechanically simple but requires that the actuator stem and other parts tilt as the arm rotates. Other similar configurations are known with the actuator stem guided and an intermediate toggle link or bellcrank arrangement in the drivetrain.

f. An AOV assembly, having a quarter-turn valve with a scotch-yoke drive, or, alternately, rack-and-pinion. Values of interest are actuator force and valve stem torque. Force is preferably measured in the actuator stem or one of the connector pieces. Torque is preferably measured in the torque arm or the valve stem.

The internally gauged, permanently instrumented shaft of the present invention is used in an existing actuated valve assembly as a replacement for an existing shaft, or, in alternate embodiments, is installed as part of a new actuated valve assembly. As the valve is actuated to either open or close a valve port, the forces exerted upon the instrumented shaft, such as the axial or thrust force exerted as a valve stem is moved longitudinally and/or torsional forces exerted on the valve stem, are measured by the internal monitoring instrument. The monitoring instrument sends signals via transmission lines or wires to a control unit for the valve assembly to provide data necessary to evaluate the condition of the actuated valve assembly.

The present disclosure further relates to a method of utilizing any force or torque measurement, regardless of the instrumentation used to measure it (though preferably facilitated by the apparatus of the present invention), as a process control feedback signal, providing immediate information on the effects of a given change in the control signal. For instance, a feedback system that reads both torque and position together with actuating signal on a quarter-turn valve continuously monitors the drag and inertia apparent in the response, compensating for these and providing consistent performance across a range of conditions. Such a feedback system is, in accordance with one exemplary embodiment of the present invention, used in conjunction with flow and pressure information to create a system provides only the forces and torques required to function optimally, avoiding the wear, stress, and damage caused by saturation loads at control extremes. Another exemplary embodiment involves air operated valves that are seated by allowing the control signal to saturate and build as much thrust as the air supply will generate—this is controlled based on system conditions and the need for seating force, or alternately, limited to a maximum value based on the thrust or torque instrument readings.

Various objects, features and advantages of the present invention will become apparent to those of skill in the art upon review of the following detailed description, when viewed in conjunction with the accompanying drawings.

BRIEF DESCRIPTION OF THE DRAWINGS

FIG. 1A is a schematically represented side view of a permanently instrumented actuated valve assembly with an internally-gauged, permanently instrumented shaft according to an embodiment of the present invention.

FIG. 1B is a side elevational view taken in cross section of thrust and torque measuring instruments in axial and transverse bores of the shaft of FIG. 1A.

DETAILED DESCRIPTION OF THE PREFERRED EMBODIMENTS

Figure 2A:
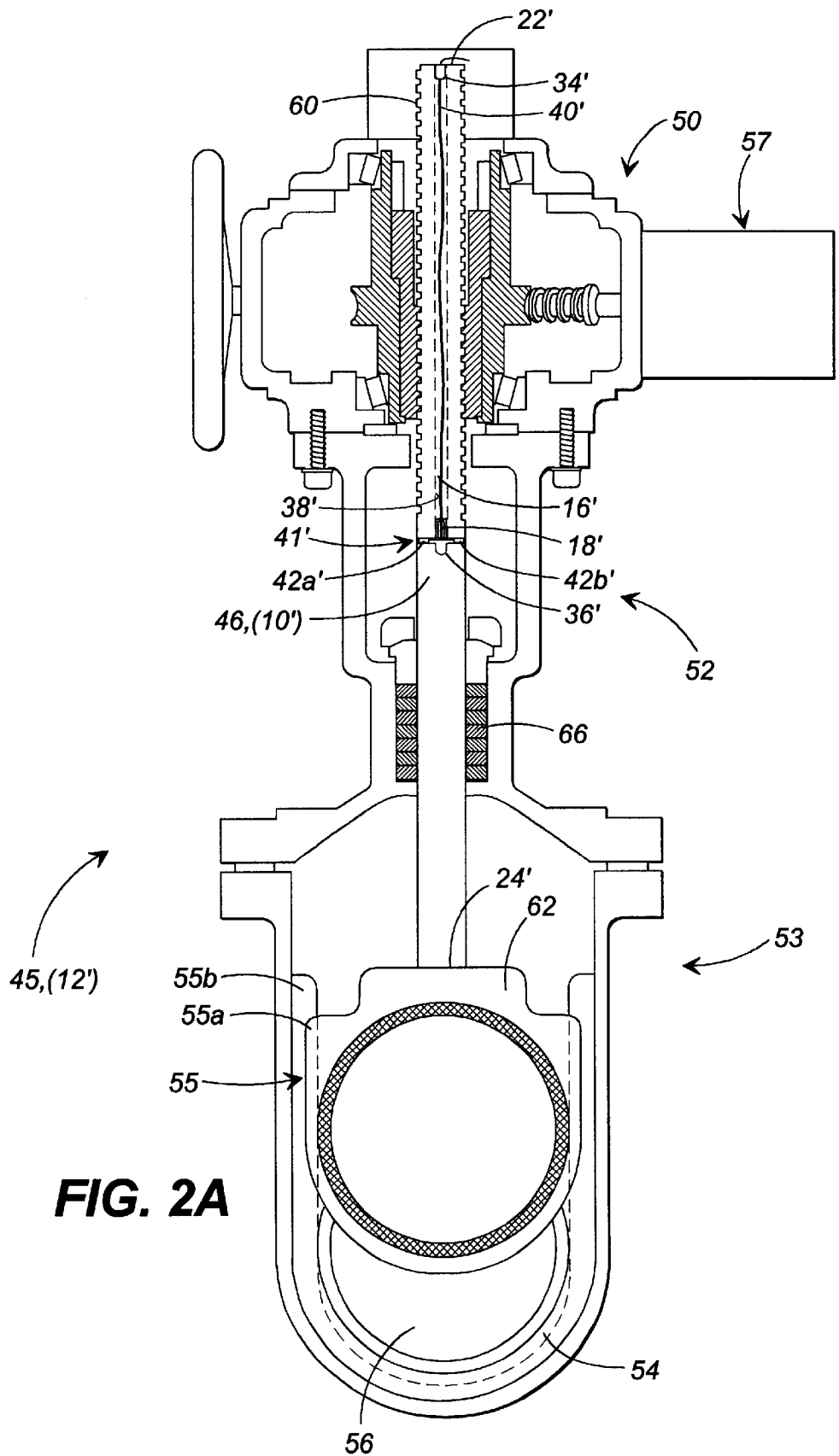
FIG. 2A is a side elevational view, taken in partial cross section, of a permanently instrumented actuated valve assembly of the present invention, depicting a motor operated valve assembly embodiment with rising, non-rotating valve stem.

Referring now in greater detail to the drawings in which like numerals indicate like parts through the several views, FIG. 1 illustrates an exemplary embodiment of an internally gauged permanently instrumented shaft 10 for use preferably in an actuated valve assembly 12 (generically represented in FIG. 1 by the "cloud" 12). The instrumented shaft 10 of the preferred embodiments of the present invention generally includes an elongated shaft body 14 typically formed from a metal such as stainless steel or other high strength, noncorrosive material having an internal longitudinal bore 16 formed along the length thereof, in which is received an internally mounted, precalibrated thrust monitoring instrument or gauge 18. In the present embodiment illustrated in FIG. 1, the longitudinal bore 16 is formed as a blind center axial gun-drilled bore (the "axial bore") formed by the method of gun-drilling through the center of the stem or shaft 10. As shown in FIG. 1A, the shaft or stem 10 includes an exterior surface or wall 20, a first or upper end 22, and a second or lower end 24.

As illustrated in FIG. 1A, the internal axial bore 16 extends along a centerline 26 from the first end 22 of the body 14 extending along the length of the body to an intermediate point 32 within the body. The longitudinal bore 16 includes an open first end 34, an enclosed second end 36 within the stem and an internal wall 38. The monitoring instrument 18 is received within the bore 16 adjacent its second or lower end 36 so as to be enclosed, and thus protected, within the shaft 10.

Transmission wires or cable 40 are connected to the monitoring instrument 18 and extend along the length of the longitudinal bore 16 to the first end 34 thereof, exiting the open upper end 34 of the bore. In preferred embodiments, the otherwise open first end 34 of the longitudinal bore 16 is sealed around the wiring 40. The monitoring instrument 18 accordingly is sealed within the bore 16 and thus is protected from temperature extremes, moisture and other environmental and mechanical conditions of influences within the actuated assembly in which the stem is mounted that could adversely affect the performance of the monitoring instrument. In alternate (particularly retrofit) embodiments, the wiring 40 terminates at the sealed end 34 with connectors (not shown) to which external wiring is selectively connected. The wires are linked to and communicate with a controller or display unit for monitoring or controlling the valve assembly or other assembly in which the actuated stem is used.

During operation or actuation of the shaft 10, such as in actuated valve assemblies 12 as discussed below, the monitoring instrument 18 will monitor tension/compression ("thrust") forces acting on the shaft and send signals vis-a-vis transmission wires or cable 40 to a display or computer control unit (not shown), indicating the forces acting on the shaft.

In addition, as illustrated in FIGS. 1A and 1B, certain embodiments of the present invention in corporate a transverse bore 41 formed within the shaft 10, which transverse bore extends from the internal axial bore 16 to the exterior side wall 20 of the shaft 10. The preferred embodiment includes a full diameter transverse bore 41 extending fully through the shaft 10 and intersecting the axial bore 16. Alternate embodiments include a redial bore extending only from the axial bore, in one direction, to the shaft exterior side wall 20. A torque monitoring instrument 42a (or instruments 42a, 42b, in the case of a full diameter bore) is mounted within the transverse bore 41. The ends of the traverse bore 41 are sealed with plugs or a filler material 43a, 43b, such as a Belzona molecular metal, and the ends are then machined smooth to ensure the side wall of the stem is smooth. Such torque monitoring instrument 42a,b provides a torque measurement of torsional forces acting on the shaft 10 as desired or necessary. Wiring 40a from the torque monitoring instrument 42a, 42b exit the stem 10 through the axial bore 16 at its first end 34.

The monitoring instrument 18, 42a, 42b typically include a strain gauge or plurality strain gauges for monitoring the axial and torsional forces on the stem during actuation. Preferably, the monitoring instruments 18, 42a, 42b will have less than 3% FS accuracy and greater than 1.5 mv/v sensitivity and is crosstalk-compensated,modulus-compensated and temperature-compensated and is pre-calibrated for measurement of the desired particular load parameters in a precision loading frame. Measurement of axial and torsional forces in components with internal bores or passageways can be accomplished by several methods. The preferred methods involve securing a strain-sensing gage, or system of such gages, to a surface of the component wherein a strain will be exhibited that is approximately proportional to the magnitude of applied force or torque, or the intended measured parameter thereof, in a manner such that the applied strain gage(s) will experience the same strain as the surface to which they are attached.

Figure 5A:
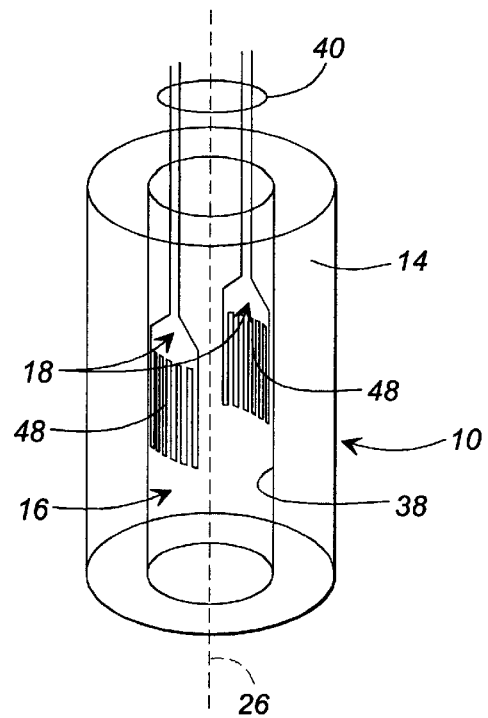
FIGS. 5A–5C show arrangements of the attachment of the gage to the bore wall.
Figure 5B:
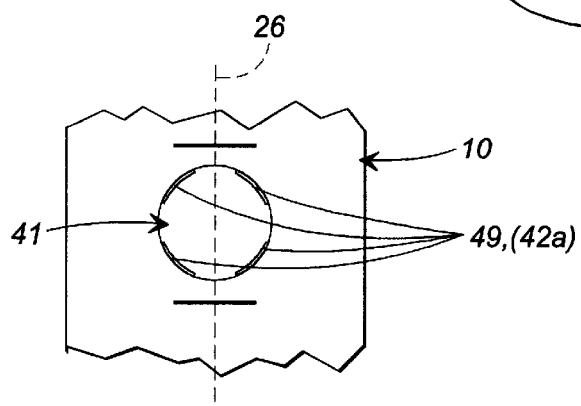
Figure 5C:
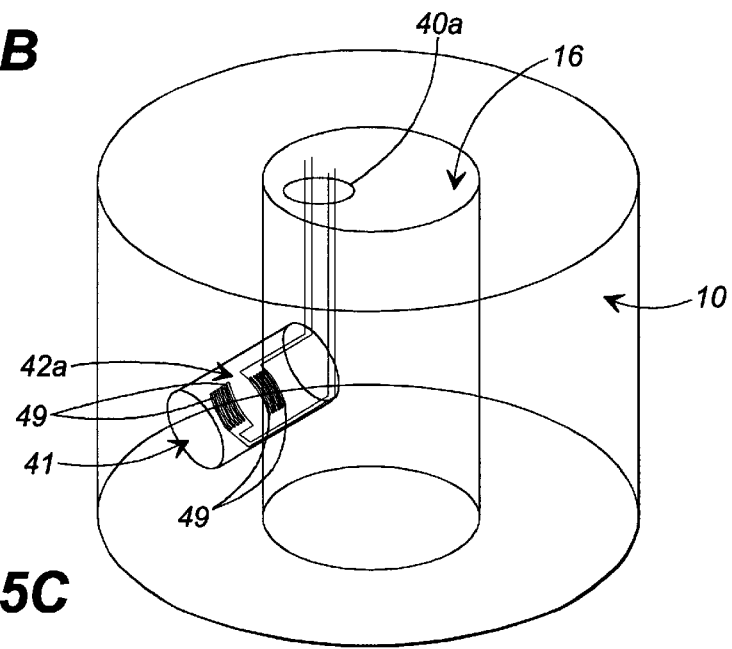

This is, preferably, done by adhesively attaching the gage(s) to the surface with their sensing grids aligned with the direction of strain that will be produced by the measured parameter. For example, in a component with an axial cylindrical bore 16 that lies on or parallel to the line of action of the intended measured force, gages 48 are glued to the bore walls with their grids aligned with the bore axis 26 (see FIGS. 5A–5C). Similarly, in a component with a transverse bore 41 that proceeds radially outward away from the axis 26 about which an intended torque parameter acts, gages 49 are, preferably, applied to the wall of the bore such that their sensing grids are aligned circumferentially around the bore and their active areas are positioned in the quadrants where tensile and compressive strains are generated as the initially circular bore cross-section becomes an ellipsoid under the shear stress created by torsion in the part. Alternately, gage installations are applied by rolling the gage(s) into a tube shape, with the sensing grids aligned either with the axis of the tube or circumferentially around the axis of the tube depending on the intended measurement, and potting them into an adhesive or filler plug that is formed within the bore and experiences the same strain as the bore walls. A further technique of mounting the gauge within the bore involves housing the monitoring instrument within a thin, pre-tensioned member that is received within the bore, with the gauge or monitoring instrument being suspended and tensioned between the ends of the pre-tensioned member. The pre-tensioned member is positioned in a gauge area at which the majority of the strain placed on the stem is concentrated so that the monitoring instrument is subjected to the focal point of the overall strain applied to the stem.

These strain-sensing gages are typically resistance grids that change resistive value proportionally to an applied strain. Once secured into the component so as to experience the desired strain, the gages are configured into a circuit that will produce an electrical output proportional to the measured strain, and thereby the force or torque parameter of interest. These are several ways to form these circuits, including use of a measurement of the resistive change of a single gage and, more commonly, a measurement of the net difference in resistance of the arms of the common "Wheatstone bridge" circuit. The Wheatstone bridge can be used with active gages in all four arms, usually arranged so that two are "negative-going" and two are "positive-going" with increasing strain, producing an additive effect on resistive difference and thus signal amplitude, or with one or more inactive circuit arms formed by completion resistors. All of these devices and methods are well known an practiced within the art.

Alternate approaches include the insertion of a piezoelectric device into a bore or passageway such that the deformation of the bore under the strain caused by the measured parameter causes a force to be applied to the device and a piezoelectric signal to be generated, and the sensing of strain deformation by the use pairs of sensitive proximity instruments such as those based on the Giant Magnetoresistive effect. These methods are less well developed but are known in the art and related literature.

One embodiment of a permanently instrumented actuated valve assembly 12' of the present invention outfitted with one embodiment of an internally gauged permanently instrumented shaft 10' of the present invention is illustrated in FIG. 2A. The embodiment of FIG. 2A illustrates a rising, non-rotating-stem motor-operated valve assembly 45 (12') having an internally gauged permanently instrumented shaft 10' structurally functioning as the valve stem 46. The valve stem 46 (10') is of the instrumented stem embodiment, according to the present invention, which includes both an axial bore 16' instrumented with a thrust measuring instrument 18' and a transverse bore 41', preferably a full diameter transverse bore instrumented with a torque measuring instrument 42' of the type including dual, off-set gauge sets 42a', 42b'.

The motor-operated valve assembly of FIG. 2A includes an actuator section 50' at which a drive system 51 for the rising, non-rotating motor-operated valve assembly 45 is mounted, a yoke section 52, and a valve body section 53 which includes a valve chamber 54, a valve port or opening 56 (in communication with a fluid conduit, not shown), and a valve element 62 (shown as a gate) attached to the stem 46 (10') and controlled by the valve assembly for controlling the flow of fluid through the valve port. The drive system 51 is connected to an actuator motor 57 and to the instrumented valve stem 46 for translating the driving force of the actuator to the valve stem to move the valve stem axially in the direction of arrows A and A'. A gland seal 66 and packing are provided at the junction between the yoke and valve body sections 52 and 53 of the rising, non-rotating motor-operated valve assembly 45. In addition, an anti-rotation device 55 is provided, depicted in the embodiment of FIG. 2A as a linear guide or rail 55a on the disk 62 itself cooperating with a guide/rail 55b formed in the valve body 53. Other anti-rotation devices will be apparent to those skilled in the art, including, but not limited to, a lever arm (not shown) fixed to the stem 46 that rides a slot in the yoke 52, or a key (not shown) fixed in the upper yoke flange or yoke arm that rides a slot in the stem. Except as otherwise discussed herein, the components and operation of the rising, non-rotating stem, motor operated valve assembly are as would be understood by those skilled in the art with knowledge of prior art actuated valve assemblies and, as such, no further discussion is deemed necessary beyond what appears in this disclosure.

The bore 16', typically formed as a blind center axial gun-drilled bore, includes an open upper end 34', a lower end 36' terminating within the valve stem 46 (10') at an intermediate point along the length of the valve stem, and a side wall 38'. The thrust monitoring instrument 18' is, preferably, located within the stem bore 16' at a position that will assure, to the greatest degree possible, that the instrument remains located above the packing gland 66 throughout the entire open and close travel cycle of the gate 62. The monitoring instrument 18' is mounted within the valve stem 46 (10'), as discussed above, and measures the stress and actual force being applied thereto due to the sliding movement of the valve stem in response to actuation by the drive system and actuator. The torque monitoring instruments 42a', 42b' are mounted within the transverse bore 41', as discussed above, and measure the torque within the valve stem 46 (10').

The monitoring instruments 18', 42a, 42b produce signals indicative of the thrust load and torque being placed on the valve stem 46 (10') and transmit such signals via transmission wires or cable 40' to a receiving or monitoring display such as a computer or other type of controller for the actuated valve assembly, although other methods of transmission also can be used such as radio transmitted signals such that a wire or cable is not required. As a result, the thrust and torque being placed on the valve stem 46 can be actively monitored as can other desired parameters that are indicative of the performance of the valve and its ability to tightly seal the valve opening and control the flow through the valve opening as needed.

Figure 2B:
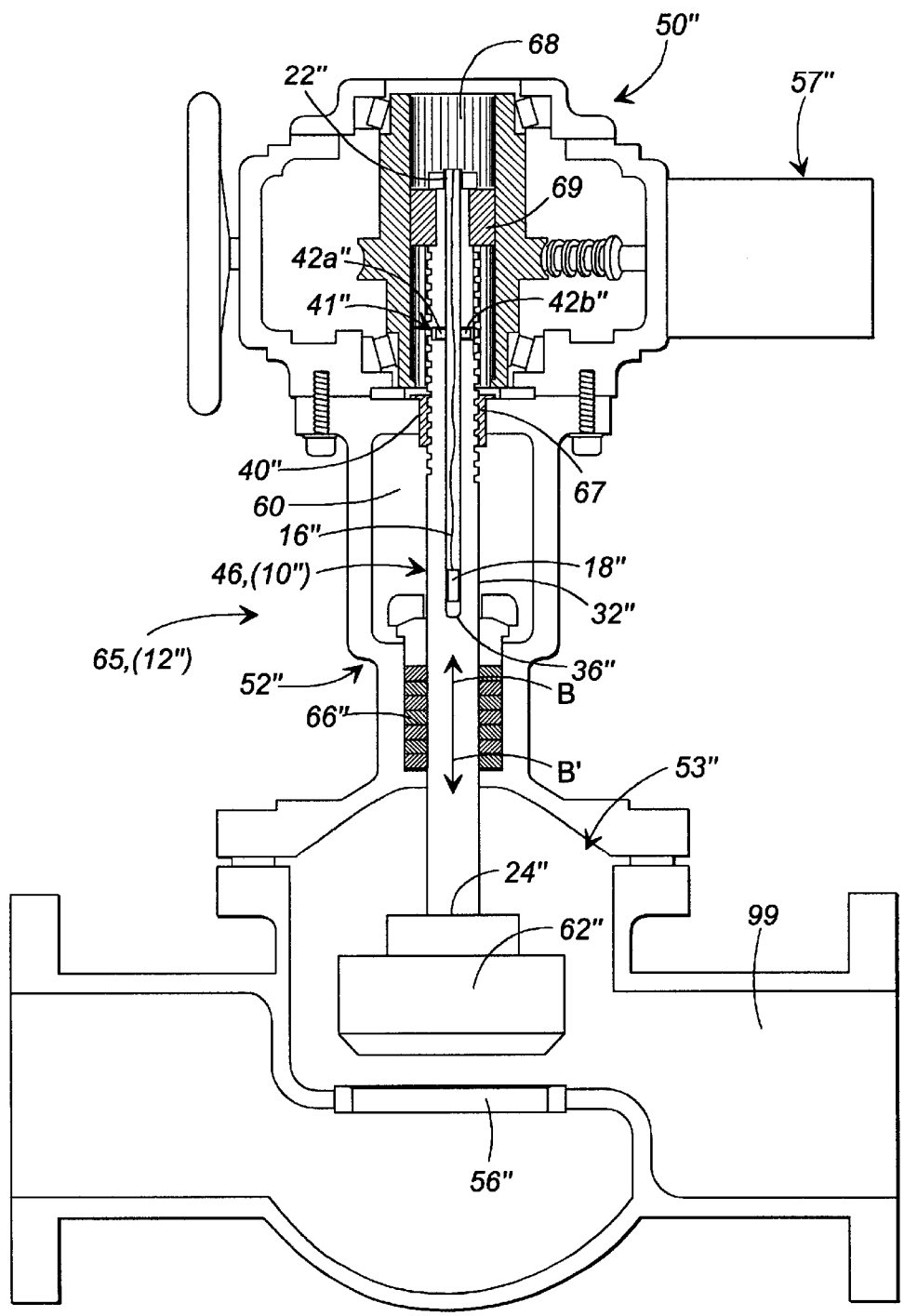
FIG. 2B is a side elevational view, taken in cross section, of a motor operated rising, rotating-stem permanently instrumented actuated valve assembly embodiment of the present invention.

FIG. 2B illustrates another embodiment of a permanently instrumented actuated valve assembly 12" outfitted with a second embodiment of an internally gauged permanently instrumented shaft 10" of the present invention. The embodiment of FIG. 2B illustrates a rising, rotating-stem motor-operated valve assembly 65 (12") with an internally gauged permanently instrumented shaft 10" structurally functioning as the valve stem 46" (10"). The motor-operated valve assembly 90(12") includes an actuator section 50" housing a drive system 51" and actuator motor 57", a yoke section 52" having a center region 67" and a valve body section 53" that generally is formed as part of a fluid conduit 99 and which includes a valve port or opening 56" for which passage of a fluid through the conduit 99 is controlled. In the embodiment of the rising, rotating stem motor-operated valve assembly 65(12") of FIG. 2B, the valve stem 46" (10") includes a first end 22" engaged by the drive system 51" and a second end 24" having a valve element 62" (shown as a plug) with a tapered lower end 63 that is received and seats within the valve port 56" to seal and close the valve port. Depicted in FIG. 2B are an internally splined drive sleeve 68 which is a component of the drive system 51" and an externally spline drive nut fixed to the first or upper end 22" of the valve stem 46" (10"), which drive nut slides axially inside the drive sleeve. The stem 46" (10") is screwed through a threaded, fixed yoke nut 67 mounted to the yoke section 52" at the actuator section side of the yoke section. A series of threads 60" are formed about the exterior surface 20" of the valve stem 46' (10"). A gland seal 66" is formed about the valve stem between the yoke section 52" and the valve body section 53" of the rising, rotating-stem motor operated valve assembly 65. Except as otherwise discussed herein, the components and operation of the motor operated rising, rotating-stem valve assembly are as would be understood by those skilled in the art with knowledge of prior art actuated valve assemblies and, as such, no further discussion thereof is deemed necessary beyond what appears in this disclosure.

As shown in FIG. 2B, in accordance with the present invention, a longitudinal bore 16" is formed axially through the valve stem 46" (10"), extending from the first end 22" of the valve stem to an intermediate point 32" within the valve stem. A thrust monitoring instrument 18" such as, but not limited to, that previously discussed, is mounted within the bore 16" for monitoring the axial or thrust forces acting on the valve stem 46" (10"). The thrust monitoring instrument 18" is, preferably, located within the stem bore 16" at a position that will assure, to the greatest degree possible, that the instrument remains located between the yoke nut 67 and the packing gland 66 throughout the entire open and close travel cycle of the plug 62". Signals are sent by the thrust monitoring instrument 18" to a receiving device such as a computer controller (not shown) to indicate the forces and other measured parameters acting on the valve stem.

In addition, in accordance with the present invention, for a rising, rotating-stem motor-operated valve in which the valve stem 46" (10") is moved axially as well as rotated so that axial or thrust forces and torque are applied to the valve stem, a transverse bore 41" is, preferably, also formed through the valve stem. The transverse bore 41" is preferably a full diameter transverse bore instrumented with a torque measuring instrument 42" of the type including dual, off-set gauge sets 42a", 42b". The torque monitoring instruments 42a", 42b" are mounted within the transverse bore 41" and the ends of the transverse bore are sealed as previously discussed. The transverse bore 41", and thus the torque monitoring instruments 42" are, preferably located along the stem at a position that will assure, to the greatest degree possible, that the bore and instruments remain located below the splined drive nut 68 and above the fixed yoke not 67 throughout the entire open and closed travel cycle of the plug 62". The torque-measuring instrument provides feedback information as to the torque being exerted on the valve stem as it is rotated by the actuator in addition to the feedback information regarding the axially or thrust forces being applied to the valve stem as provided by the thrust monitoring instrument 18".

Figure 3:
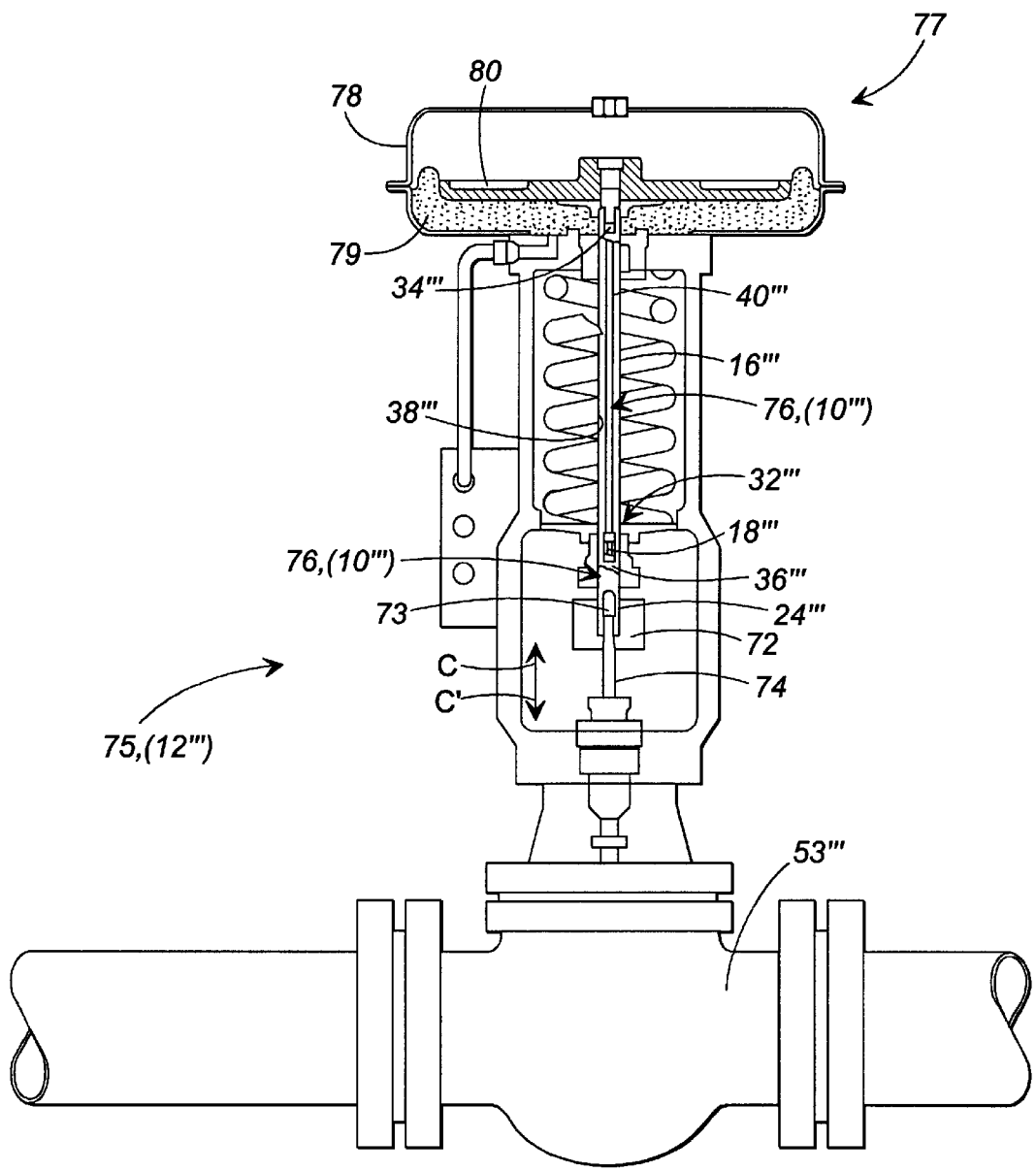
FIG. 3 is a side elevational view taken in partial cross section of an air operated, rising, non-rotating-stem, spring and diaphragm permanently instrumented, actuated valve assembly embodiment of the present invention with a two piece stem.

FIG. 3 shows an additional embodiment of a permanently instrumented actuated valve assembly 12'" of the present invention embodied as a linear, non-rotating-stem spring and diaphragm air operated valve assembly 75 with an internally gauged permanently instrumented shaft 10'" functioning as the actuator stem/76. The load path components of the permanently instrumented AOV valve assembly 75 (12'") are seen as including, at least, a split stem comprised of the actuator stem 76 and a valve stem 74, which valve stem floats within a receptor cavity 73 of the actuator stem 76, and is joined to the actuator stem by a connecting block 72. In the depicted embodiment, the actuator stem 76 is an internally gauged permanently instrumented shaft 10'" in accordance with the present invention. In alternate embodiments, the valve stem 74 is an internally gauged permanently instrumented shaft.

The air operated valve assembly 75 (12'") includes an actuator 77, here shown as a spring and diaphragm type actuator, which includes a housing 78 defining an internal chamber 79 in which is received a flexible diaphragm 80. The internal chamber 79 is connected to an air supply 8 which supplies a flow of air under pressure to the chamber below the diaphragm 80 so as to cause movement of the diaphragm upwardly toward the top of the housing. The diaphragm 80 is in turn connected to the actuator stem 76 such that as the diaphragm is moved upwardly in response to the flow of air into the chamber, the actuator stem is caused to move upwardly in the direction of arrows "C". The spring imparts a biasing force against the valve stem to cause the valve stem to be urged in the direction of arrow C' so as to maintain the valve in the closed state until air is supplied to the chamber of the actuator with sufficient force and pressure to overcome the biasing force of the spring and move the diaphragm upwardly, and thus cause the stem to be moved upwardly in the direction of arrow C to open the valve. Except as otherwise discussed herein, the components and operation of the air actuated spring and diaphragm valve assembly 75 (12''') of FIG. 3 are as would be understood by those skilled in the art with knowledge of prior art actuated valve assemblies, and as such, no further discussion is deemed necessary beyond what appears in this disclosure.

The actuator stem 76 (10''') further includes a longitudinal, internal bore 16''' formed axially through its center. Typically, the bore 16''' will be formed as a blind center gun-drilled axial bore, as discussed above, having an upper end 34''' and a lower end 36''' that terminates at an intermediate point within the actuator stem adjacent its second end 24''', and further includes an internal side wall 38'''. A thrust monitoring instrument 18''' such as a strain gauge or plurality of strain gauges or similar force measurement device is received within the internal bore 16''' and is mounted at the lower end 36'''. The monitoring instrument monitors the axial force or stress applied to the actuator stem 76 (10''') and transmits measurements or signals indicating such forces or other parameters via transmission lines or wires 40''' to a controller or other monitoring device for the actuated valve assembly (now shown).

Thus, as air is applied and released from the inner chamber of the actuator, so as to cause the diaphragm to be moved upwardly or downwardly in response to the increasing air pressure or the biasing action of the spring, the actuator stem 76 (10''') and, thus, the valve stem 74 are moved axially in the direction of arrows C and C' to open and close the associated valve. During such operation, the axial or thrust forces acting on the actuator stem 76 (10'''), and other desired parameters, are monitored and are communicated back to a valve controller (not shown) to provide an indication of the performance of the actuated valve assembly and an indication of the potential failure of the actuated valve assembly or a decrease in effectiveness.

Figure 4:
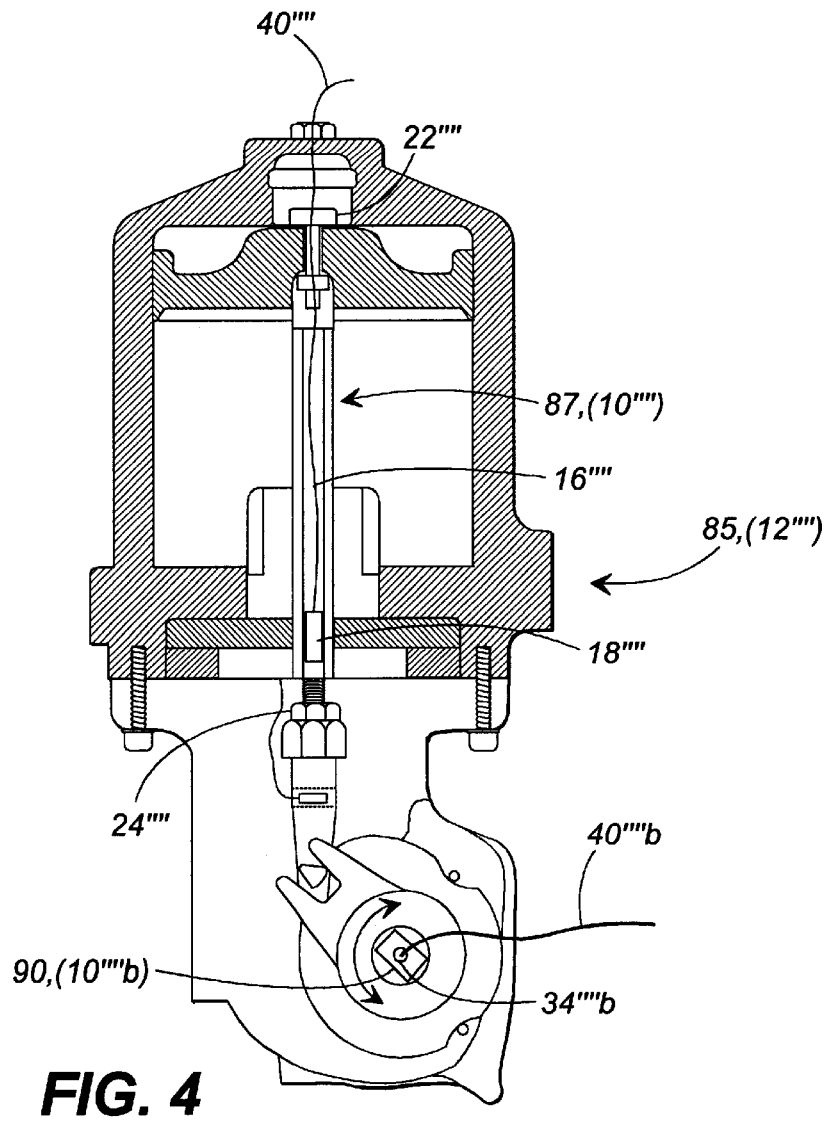
FIG. 4 is a top planar view, taken in cross section, of a piston-version, air-operated actuator for a quarter-turn non-rising-stem permanently instrumented actuated valve assembly embodiment of the present invention.

FIG. 4 illustrates still another embodiment of a permanently instrumented actuated valve assembly 12'''' of the present invention, embodied as a quarter-turn, rotary valve, piston actuated air operated valve assembly 85. The permanently instrumented actuated valve assembly 85 (12''''), which quarter turn valve, depicted in FIG. 4 is outfitted, in accordance with the present invention, with two of its load bearing components being comprised of internally gauged permanently instrumented shafts in accordance with the present invention—those shafts being the piston rod (functioning as an actuator stem) 87, which actuator stem is provided with a longitudinal bore 16'''' instrumented with a thrust monitoring instrument 18'''' for measuring of thrust forces within the actuated valve assembly; and the other shaft is the valve stem 90 (see FIG. 4A) which supports and turns the butterfly (or other quarter-turn) valve 92 within the valve body section 53''''. The valve stem 90 is provided with a longitudinal bore 16''''b which is not instrumented (since thrust on this load path component is not of interest in this disclosed embodiment) and is also provided with a transverse bore 41'''', preferably a full diameter bore which intersects with the longitudinal bore, and which transverse bore is instrumented with a torque monitoring instrument 42'''', preferably comprised of the two offset gauge sets 42a'''' and 42b''''. Except as otherwise discussed herein, the components and operation of the piston actuated air operated valve assembly with quarter turn, rotary valve are as would be understood by those skilled in the art with knowledge of prior art actuated valve assemblies and, as such, no further description is deemed necessary beyond what appears in this disclosure.

Figure 4A:
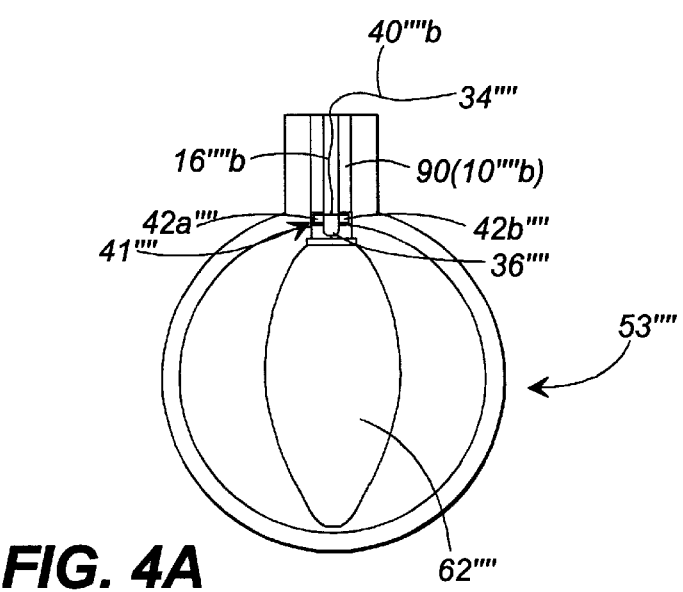
FIG. 4A is an isolated side view taken in partial cross section of the quarter-turn valve body section of the actuated valve assembly embodiment of FIG. 4.

The thrust monitoring instrument 18'''' is provided for measuring the force being exerted on the actuator stem 87 (10''''), and wiring 40'''' delivers thrust measurement signals to the controlling computers which are providing desired force measurement information. With reference to FIG. 4A, instrument wiring 40''''b from the torque measuring instruments 42'''' exit from the transverse bore 41'''' through the longitudinal bore 16''''b and out the open end 34'''' for access outside of the actuated valve assembly 80.

Whereas this detailed description has provided detail with respect to certain actuated valve assemblies which embody principals of the present invention, it will be understood that other permanently instrumented actuated valve assemblies having internally gauged permanently instrumented load path components are within the scope of the present invention and will be apparent to those skilled in the art upon reading and understanding the present specification.

While there has been shown various preferred embodiments of the present invention, it will be understood by those skilled in the art that various modifications, changes and additions can be made in the forms and arrangement of the elements without departing from the underlying spirit and scope of the present invention as set forth in the following claims. In addition, corresponding structures, materials, acts, and equivalents of all means or step plus function elements in any claims hereafter are intended to include any structure, material, or act for performing the functions in combination with other claimed elements.

What is claimed is:

1. A valve assembly, comprising:
   a valve stem having a cylindrical body having a first end and a second end, a valve seal mounted to said second end, and an internal bore formed within said valve stem and extending from said first end of said body to an intermediate point within said valve stem;
   a monitoring instrument received within said internal bore for monitoring internal strains acting on said valve stem and generating signals indicative of the monitored parameters of said valve stem;
   means for moving said valve stem to open and close the valve assembly; and
   receiving means for receiving signals from said monitoring instrument to indicate the condition of said valve stem.

2. The valve assembly of claim 1, wherein said means for moving said valve stem comprises a drive motor.

3. The valve assembly of claim 1 and wherein said means for moving said valve stem comprises a pneumatic actuator.

4. The valve assembly of claim 1 wherein said monitoring instrument monitors the thrust load on said valve stem.

5. The valve assembly of claim 1, wherein said valve stem further includes, at least one transverse bore extending from said internal bore to an exterior surface of said valve stem.

6. The valve assembly of claim 5, further comprising a second monitoring instrument received within said transverse bore, said second instrument generating signals indicative of desired monitored parameters of said valve stem.

7. The valve assembly of claim 6, wherein said second monitoring instrument monitors the torsional forces on said body.

8. The valve assembly of claim 1, and further including a receiving means in communicative connection with monitoring instrument and said means for moving said valve stem for receiving said signals from said monitoring instrument and controlling said means for moving, whereby said means for moving said valve stem moves said valve stem to selectively open and close the valve upon receipt of predetermined signals from said monitoring instrument.

* * * * *